United States Patent
Omura

(10) Patent No.: US 10,090,013 B2
(45) Date of Patent: Oct. 2, 2018

(54) BINDER FOR MAGNETIC RECORDING MEDIUM AND METHOD OF MANUFACTURING THE SAME, COMPOSITION FOR MAGNETIC RECORDING MEDIUM, AND MAGNETIC RECORDING MEDIUM

(71) Applicant: FUJIFILM CORPORATION, Tokyo (JP)

(72) Inventor: Kazufumi Omura, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 662 days.

(21) Appl. No.: 14/670,795

(22) Filed: Mar. 27, 2015

(65) Prior Publication Data
US 2015/0279405 A1 Oct. 1, 2015

(30) Foreign Application Priority Data

Mar. 28, 2014 (JP) ................. 2014-070574

(51) Int. Cl.
*G11B 5/702* (2006.01)
*C08F 214/06* (2006.01)

(52) U.S. Cl.
CPC .......... *G11B 5/7023* (2013.01); *G11B 5/7028* (2013.01)

(58) Field of Classification Search
CPC ........ C08F 214/06; C08F 14/02; G11B 5/702; G11B 5/7023; G11B 5/7028
See application file for complete search history.

(56) References Cited

U.S. PATENT DOCUMENTS 4,707,411 A 11/1987 Nakayama et al.

FOREIGN PATENT DOCUMENTS

| JP | 60-238306 A | 11/1985 |
|---|---|---|
| JP | 11-213379 A | 8/1999 |

OTHER PUBLICATIONS

Office Action dated Mar. 15, 2016 from the Japanese Patent Office in counterpart Japanese Application No. 2014-070574.

*Primary Examiner* — Peter F Godenschwager
(74) *Attorney, Agent, or Firm* — Sughrue Mion, PLLC

(57) ABSTRACT

An aspect of the present invention relates to binder for a magnetic recording medium, which is vinyl chloride resin comprising at least one side chain, the side chain comprising at least one urethane bond and at least one monovalent sulfur-containing substituent denoted by formula (1):

$$—S—A—Z \qquad (1)$$

wherein, in formula (1), A denotes a divalent connecting group which may comprise one or more active hydrogen groups and Z denotes an active hydrogen group.

20 Claims, No Drawings

BINDER FOR MAGNETIC RECORDING MEDIUM AND METHOD OF MANUFACTURING THE SAME, COMPOSITION FOR MAGNETIC RECORDING MEDIUM, AND MAGNETIC RECORDING MEDIUM

CROSS-REFERENCE TO RELATED APPLICATIONS

This application claims priority under 35 U.S.C 119 to Japanese Patent Application No. 2014-070574 filed on Mar. 28, 2014. The above application is hereby expressly incorporated by reference, in its entirety.

BACKGROUND OF THE INVENTION

Field of the Invention

The present invention relates to binder for magnetic recording medium and method of manufacturing the same, a composition for a magnetic recording medium which comprises the binder for magnetic recording medium, and a magnetic recording medium Discussion of the Background In the manufacture of a particulate magnetic recording medium (also referred to simply as a "magnetic recording medium", hereinafter), a coating composition normally comprising binder along with ferromagnetic powder, nonmagnetic powder, and the like is directly coated, or indirectly coated through at least one another layer, on a nonmagnetic support. As needed, the coating is heated, irradiated with light, or the like to conduct a curing treatment, thus forming a magnetic layer, a nonmagnetic layer or the like.

The binder (binder for a magnetic recording medium) that is employed in the above coating composition can play an important role in the various capabilities of the magnetic recording medium. By way of example, Japanese Unexamined Patent Publication (KOKAI) Showa No. 60-238306 or English language family member U.S. Pat. No. 4,707,411, which are expressly incorporated herein by reference in their entirety, discloses vinyl chloride resin as such binder for a magnetic recording medium.

SUMMARY OF THE INVENTION

An example of one property that is required of a magnetic recording medium is high running durability that will stand up to repeated running. Thus, it is effective to form coatings with a high degree of hardness as coatings such as the magnetic layer and nonmagnetic layer. In this regard, vinyl chloride resin is known to be resin that is capable of forming hard coatings.

The requirement of running durability in magnetic recording media has been intensifying in recent years. The forming of hard coatings that can exhibit scratch resistance even with longer periods of repeated running has been required of the coatings of the magnetic layer, nonmagnetic layer, and the like. However, coatings that have been formed of conventional vinyl chloride resin have not necessarily afforded hardness on a par with the hard coatings that have been demanded in recent years.

An aspect of the present invention provides for vinyl chloride resin that is used as binder for a magnetic recording medium and that can permit the formation of hard coatings.

An aspect of the present invention relates to binder for a magnetic recording medium, which is vinyl chloride resin comprising at least one side chain, the side chain comprising:

at least one urethane bond; and
at least one monovalent sulfur-containing substituent denoted by formula (1):

$$—S-A-Z \qquad (1)$$

wherein, in formula (1), A denotes a divalent connecting group which may comprise one or more active hydrogen groups and Z denotes an active hydrogen group.

The above binder for a magnetic recording medium makes it possible to form hard coatings, more specifically, coatings that exhibit a high Young's modulus and a high stress at rupture. The term "stress at rupture" is the stress when the coating ruptures in a tensile test (the details of which are set forth further below). The coating, with its high Young's modulus and high stress at rupture value can be a hard coating that tends not to scratch even with extended periods of repeated running.

The following, which have been presumed by the present inventor, are not to be construed as limiting the invention in any way. The present inventor presumes that the urethane bond and the monovalent sulfur-containing substituent that are incorporated into the side chain can contribute to increasing the hardness of the coating that is formed from the vinyl chloride resin. The present inventor presumes that the monovalent sulfur-containing substituent can have good reactivity (a good crosslinking property) with curing agents having functional groups that are capable of reacting with the above active hydrogen groups, and thinks that its use in combination with such a curing agent can form an even harder coating.

A further aspect of the present invention relates to a method of manufacturing the above binder for a magnetic recording medium in which a Michael addition is utilized, which comprises:

reacting hydroxyl-group containing vinyl chloride resin with an unsaturated bond-containing compound which comprises at least one isocyanate group and at least one unsaturated bond-containing group selected from the group consisting of an acryloyloxy group, a methacryloyloxy group, an acryloyl group, and a methacryloyl group, to form a urethane bond between the hydroxyl group in the vinyl chloride resin and the isocyanate group in the unsaturated bond-containing compound and yield vinyl chloride resin comprising at least one urethane bond and at least one unsaturated bond-containing group in a side chain, and subjecting the vinyl chloride resin that has been yielded and a thiol comprising at least one active hydrogen group to a Michael addition reaction in a solvent, to yield the above binder for a magnetic recording medium.

In an embodiment, in formula (1), A denotes an alkylene group which may be substituted with one or more active hydrogen groups.

In an embodiment, the active hydroxyl group denoted by Z is a hydroxyl group.

In an embodiment, the active hydrogen group denoted by Z is a hydroxyl group.

In an embodiment, the above binder for a magnetic recording medium further comprises at least one epoxy group-comprising side chain.

In an embodiment, in the above manufacturing method, the active hydrogen group is a hydroxyl group.

In an embodiment, in the above manufacturing method, the Michael addition reaction is conducted in a base-containing solvent.

In an embodiment, in the above manufacturing method, the base is an organic base.

In an embodiment, in the above manufacturing method, the solvent comprises a ketone solvent.

A further aspect of the present invention relates to a composition, which is a composition for a magnetic recording medium and comprises the above binder for a magnetic recording medium.

In an embodiment, the above composition further comprises a curing agent comprising a crosslinkable group capable of crosslinking with the active hydrogen group present in the binder for a magnetic recording medium.

In an embodiment, the curing agent comprise polyisocyanate.

A further aspect of the present invention relates to a magnetic recording medium comprising a magnetic layer comprising ferromagnetic powder and binder on a nonmagnetic support, which comprises a layer containing at least component selected from the group consisting of the above binder for a magnetic recording medium and a reaction product that has been formed in a reaction between the above binder for a magnetic recording medium and a curing agent comprising at least one crosslinkable group capable of crosslinking with the active hydrogen group present in the binder for a magnetic recording medium.

The binder for a magnetic recording medium according to an aspect of the present invention can permit the formation of hard coatings. Using such binder makes it possible to form a hard magnetic layer and a hard nonmagnetic layer as well as to provide a magnetic recording medium affording good running durability.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

Binder for Magnetic Recording Medium

The binder for a magnetic recording medium according to an aspect of the present invention (also referred to as "binder" below) is vinyl chloride resin comprising at least one side chain and the side chain comprises at least one urethane bond and at least one monovalent sulfur-containing substituent denoted by formula (1) above. The binder for a magnetic recording medium is binder that is employed to form various coatings such as magnetic layers and nonmagnetic layers constituting particulate magnetic recording media.

The above binder will be described in greater detail below. In the present invention, unless specifically stated otherwise, groups that are described can be substituted or unsubstituted. When a given group comprises a substituent, examples of the substituent are alkyl groups (such as alkyl groups having 1 to 6 carbon atoms), hydroxyl groups, alkoxy groups (such as alkoxy groups with 1 to 6 carbon atoms), halogen atoms (such as fluorine atoms, chlorine atoms, and bromine atoms), cyano groups, amino groups, nitro groups, acyl groups, and carboxyl groups. With regard to groups having substituents, the "number of carbon atoms" means the number of carbon atoms of the portion without the substituent. In the present invention, the word "to" indicates a range including a minimum value and maximum value in the form of the preceding and succeeding numbers.

The above binder is vinyl chloride resin having a main chain comprising a repeating unit containing the structural unit —CH$_2$CHCl—, and comprising at least one urethane bond (—O—C(=O)—NH—) and at least one monovalent sulfur-containing substituent denoted by formula (1):

(1)

in a side chain. As stated above, the present inventor presumes that the fact that the vinyl chloride resin comprises at least one urethane bond and at least one monovalent sulfur-containing substituent denoted by formula (1) in a side chain can contribute to being able to form a hard coating.

In formula (1), A denotes a divalent connecting group which may comprise one or more active hydrogen groups, and Z denotes an active hydrogen group. In the present invention, the term "active hydrogen group" refers to a functional group from which a hydrogen dissociates, permitting the formation of a crosslinked structure with another functional group (crosslinking group). Examples are a hydroxyl group, primary amino group, secondary amino group, thiol group, and carboxyl group. A hydroxyl group, primary amino group, or secondary amino group is desirable. From the perspective of the stability of the composition comprising the binder, described further above, a hydroxyl group is preferred.

A denotes a divalent connecting group which may comprises one or more active hydrogen groups. The divalent connecting group denoted by A is a connecting group connecting sulfur atom S and active hydrogen group Z in the monovalent sulfur-containing substituent denoted by formula (1). Examples of the divalent connecting group denoted by A are divalent connecting groups comprised of one, or a combination of two or more, from among —$CR^1R^2$— (where each of $R^1$ and $R^2$ independently denotes a hydrogen atom or a monovalent substituent), —O—, and —C(=O)—. The monovalent substituent referred to here is, for example, an active hydrogen group or an alkyl group having 1 to 3 carbon atoms. The alkyl group can be substituted with the acid groups set forth further below.

The divalent connecting group denoted by A is desirably an alkylene group which may be substituted with at least one acid group and/or at least one active hydrogen group; preferably an alkylene group having 2 to 30 carbon atoms which may be substituted with at least one acid group and/or at least one active hydrogen group; more preferably an alkylene group having 2 to 20 carbon atoms which may be substituted with at least one acid group and/or at least one hydrogen group; and still more preferably, an alkylene group having 2 to 10 carbon atoms which may be substituted with at least one active hydrogen group. The active hydrogen group substituted on the alkylene group, as set forth above, is desirably a hydroxyl group, primary amino group, or secondary amino group, and preferably a hydroxyl group. When the divalent connecting group denoted by A comprises at least one active hydrogen group, the active hydrogen group that is contained in A can number from 1 to 3, for example, and desirably number from 1 to 2. The acid group contained in A can number 0 or 1. From the perspective of facilitating synthesis, it is desirable for A not to contain an acid group.

One or more active hydrogen groups are contained in each monovalent sulfur-containing substituent denoted by formula (1), with 1 to 3 being desirable and 1 or 2 being preferred. The total number of active hydrogen group contained in the monovalent sulfur-containing substituent denoted by formula (1) of the above compound (the total number of the active hydrogen groups contained in the multiple side chains when multiple side chains are contained) can be denoted as the active hydrogen group equivalent specified by equation (A) below.

Active hydrogen group equivalent=active hydrogen group value [mmol/kg]×weight average molecular weight Mw/1,000,000 (A)

The active hydrogen group equivalent is, for example, equal to or higher than one, desirably equal to or higher than 5. The active hydrogen group equivalent is, for example, equal to or less than 200, and can be equal to or less than 100 or equal to or less than 50. The active hydrogen group value refers to the hydroxyl group value as obtained by the method described in Examples, set forth further below. The active hydrogen group value of active hydrogen groups other than hydroxyl groups can also be obtained as the hydroxyl group value.

In the above side chain, the sulfur-containing substituent denoted by formula (1) can be directly bonded to the urethane bond, or can be bonded through a divalent cross-linking group (denoted as "$X^1$", hereinafter). Bonding through a divalent crosslinking group is desirable. Examples of divalent connecting group $X^1$ are divalent connecting groups in the form of one, or a combination of two or more, from among —$CR^3R^4$— (where each of $R^3$ and $R^4$ independently denotes a hydrogen atom or a monovalent substituent), —O—, and —C(=O)—. An example of monovalent substituents denoted by $R^3$ and $R^4$ are alkyl groups having 1 to 3 carbon atoms. The alkyl group can be substituted with an acid group, described further below. A further example is a monovalent substituent denoted by 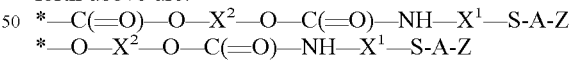. In the above, m denotes an integer of equal to or more than 1, desirably an integer falling within a range of 1 to 6, preferably an integer falling within a range of 1 to 3, more preferably 1 or 2, and still more preferably, 1. The monovalent substituent denoted by —$(CH_2)_m$—O—C(=O)—C=C can be a group derived from an unsaturated bond-containing compound employing the manufacturing method set forth further below. An example of a desirable structure for $X^1$ is -(optionally substituted alkylene group)-O—C(=O)-(optionally substituted alkylene group)-. An example of a preferred structure is *-(optionally substituted alkylene group)-O—C(=O)-(unsubstituted alkylene group)-. The * above denotes the position of the bond with the urethane bond. Examples of the optionally substituted alkylene group in the above structure are unsubstituted alkylene groups having 1 to 6 carbon atoms. The substituent that is substituted onto the alkylene group is as set forth with regard to $R^3$ and $R^4$.

At least one urethane bond is contained in the above side chain. Two or more (for example, 2 to 5) are acceptable, 1 or 2 are desirable, and 1 is preferred. When two or more urethane bonds are contained, an example of a connecting group connecting the urethane bonds is that given by way of example for the divalent connecting group connecting the urethane bond and the sulfur-containing substituent denoted by formula (1).

The above side chain can be bonded to the main chain by means of the urethane bond, or a divalent connecting group (denoted as "$X^2$", hereinafter) can be present between the urethane bond and the main chain. The presence of a divalent connecting group is desirable. Examples of divalent connecting group $X^2$ are divalent connecting groups comprising one, or a combination of two or more, from among —$CR^5R^6$— (where each of $R^5$ and $R^6$ independently denotes a hydrogen atom or a monovalent substituent), —O—, and —C(=O)—. Examples of the monovalent substituents denoted by $R^5$ and $R^6$ are alkyl groups having 1 to 3 carbon atoms. These alkyl groups can be substituted with the acid groups set forth further below. An example of a desirable structure for $X^2$ is *—C(=O)—O-(optionally substituted alkylene group)- and *—O-(optionally substituted alkylene group)-. The * denotes the position of the bond with the main chain. An example of the optionally substituted alkylene group in the above structure is a substituted or unsubstituted alkylene group having 1 to 6 carbon atoms. The substituents that are substituted onto the above alkylene groups are as given by way of example for $R^5$ and $R^6$.

Examples of desirable embodiments of the side chain set forth above are:
*—C(=O)—O—$X^2$—O—C(=O)—NH—$X^1$—S-A-Z
*—O—$X^2$—O—C(=O)—NH—$X^1$—S-A-Z
In the above, * denotes the position of the bond with the main chain.

The binder according to an aspect of the present invention is vinyl chloride resin having the above side chain, and there is no specific restriction for the structure other than the above side chain. An example of a structure other than the above side chain is an epoxy group-containing side chain. In an epoxy group-containing side chain, the structure is desirably such that the terminal epoxy group is bonded to the main chain by means of a divalent connecting group. In this context, examples of divalent connecting groups are divalent connecting groups comprised of one, or a combination of two or three, from among a methylene group, an ethylene group, and —O—; and the divalent connecting groups given by way of example for $X^1$ and $X^2$ above. As described in Japanese Unexamined Patent Publication (KOKAI) Showa No. 60-238306, the presence of an epoxy group is desirable in binder for a magnetic recording medium. The number of epoxy groups contained in the side chain of the resin is desirably about 1 to 40 per molecule.

The binder for a magnetic recording medium having an adsorptive functional group with the property of adsorbing to the surface of particles of powders such as ferromagnetic powders and nonmagnetic powders is desirable from the perspective of enhancing powder dispersion. That is because it can inhibit aggregation between particles by adsorbing onto the surface of the particles by means of the adsorptive functional group. An acid group is an example of such an adsorptive functional group. In this context, the term "acid group" refers to a group that can dissociate into an anion by releasing $H^+$ in a solvent (aqueous solution) containing water or in water. Examples are sulfuric acid groups, sulfonic acid groups, carboxyl groups, phosphoric acid groups, and salt forms thereof. From the perspective of further enhancing dispersion, sulfuric acid groups, sulfonic acid groups, and their salt forms are desirable. In this context, the salt form of sulfuric acid (—$SO_4H$) means a sulfate group —$SO_4M$, where M denotes a cation such as an alkali metal ion. The salt form of sulfonic acid (—$SO_3H$) means a sulfonate group —$SO_3M$, where M denotes a cation such as an alkali metal ion. The same applies to the salt forms of other groups. In an embodiment, the salt group is desirably contained on the side chain having at least one urethane bond and at least one monovalent sulfur-containing substituent denoted by formula (1). The number of acid groups contained per side chain is 1 to 3, for example.

From the perspective of coating hardness, the weight average molecular weight of the binder employed in a magnetic recording medium is generally desirably equal to or greater than 10,000. From the perspective of maintaining the viscosity of the coating liquid containing the binder at a level suitable for coating, equal to or lower than 2000,000 is desirable. From these perspectives, the weight average molecular weight of the vinyl chloride resin that is the binder according to an aspect of the present invention desirably falls within a range of 10,000 to 200,000, preferably within a range of 10,000 to 100,000. In the present invention, the weight average molecular weight refers to a value that is measured by gel permeation chromatography (GPC) and converted to standard polystyrene.

Method of Manufacturing Binder for Magnetic Recording Medium

The binder for a magnetic recording medium according to an aspect of the present invention that has been set forth above is obtained by:

reacting hydroxyl-group containing vinyl chloride resin with an unsaturated bond-containing compound which comprises at least one isocyanate group and at least one unsaturated bond-containing group selected from the group consisting of an acryloyloxy group, a methacryloyloxy group, an acryloyl group, and a methacryloyl group, to form a urethane bond between the hydroxyl group in the vinyl chloride resin and the isocyanate group in the unsaturated bond-containing compound and yield vinyl chloride resin comprising at least one urethane bond and at least one unsaturated bond-containing group in a side chain, and subjecting the vinyl chloride resin that has been yielded and a thiol comprising at least one active hydrogen group to a Michael addition reaction in a solvent, to yield the above binder for a magnetic recording medium.

The above manufacturing method will be set forth in greater detail. However, the binder for a magnetic recording medium according to an aspect of the present invention is not limited to being manufactured by the above manufacturing method. So long as it possesses the above-described side chain, it can be manufactured by any manufacturing method.

The process by which vinyl chloride resin comprising at least one urethane bond and at least one unsaturated bond-containing group set forth above in a side chain is obtained by reacting hydroxyl group-containing vinyl chloride resin with the above unsaturated bond-containing compound will be referred to hereinafter as the urethane conversion step. The above step of conducting a Michael addition reaction will be referred to as the Michael addition reaction step. The above unsaturated bond-containing group will also be referred to hereinafter as a "(meth)acryloyl(oxy) group."

<Urethane Conversion Step>

In the urethane conversion step, the hydroxyl group present in the vinyl chloride resin and the isocyanate group present in the unsaturated bond-containing compound can be reacted to form a urethane bond, thereby yielding vinyl chloride resin comprising at least one urethane bond and at least one unsaturated bond-containing group set forth above in a side chain. The urethane bond that is introduced is what becomes the urethane bond contained in the side chain set forth above. That is, this is a process in which a urethane bond is introduced into the side chain. Further, the above unsaturated bond-containing group that is introduced into the side chain in this process can be reacted with a thiol having at least one active hydrogen group in the subsequent Michael addition reaction step, thereby introducing at least one active hydrogen group into the side chain having a urethane bond.

The hydroxyl group-containing vinyl chloride resin that is employed in the urethane conversion step can be synthesized by known methods, or can be obtained as a commercial product. For synthesis methods, reference can be made to Japanese Unexamined Patent Publication (KOKAI) Showa No. 60-238306, which is expressly incorporated herein by reference in its entirety, or the like. Examples of commercial products are MR110, MR104, MR112 and MR113 made by Zeon Corporation and Solbin A, Solbin TAO, Solbin MK6, and the like made by Shin-Etsu Chemical Co., Ltd. Among these commercial products, some contain the above-described acid group in a side chain having a hydroxyl group. Using vinyl chloride resin having such a side chain as a synthesis starting material makes it possible to obtain vinyl chloride resin having a side chain containing the acid group and the monovalent sulfur-containing substituent denoted by formula (1). In the above manufacturing method, the hydroxyl-containing side chain that is present in the hydroxyl group-containing vinyl chloride resin can be converted to the above-described side chain by the Michael addition reaction step. Accordingly, it suffices to select from among commercial products hydroxyl group-containing vinyl chloride resin having as many or more hydroxyl-group containing side chains as the side chain that one desires to incorporate, or to synthesize it for use by a known method.

The unsaturated bond-containing compound having the above isocyanate group and (meth)acryloyl(oxy) group can generally be employed in the form of various compounds that are employed as components for incorporating radiation-curable functional groups in the synthesis of resins having radiation-curable functional groups. In the above manufacturing method, it suffices to select a compound having a structure permitting the incorporation of a side chain having the structure set forth in detail above from among such compounds, and to employ it in the urethane conversion step. Examples are 2-methacryloyloxyethyl isocyanate (MOI) and 1,1-(bisacryloyloxymethyl)ethyl isocyanate (BEI). These compounds can be synthesized by known methods or obtained in the form of commercial products.

In the urethane conversion step, the hydroxyl group-containing vinyl chloride resin and the unsaturated bond-containing compound can be dissolved in a solvent (reaction solvent). As needed, a reaction catalyst can be added and the mixture heated, pressurized, nitrogen backfilled, and the like to cause the reaction to progress. The reaction can also be conducted in dry air or in a dry oxygen environment. The common reaction conditions in the synthesis of resin having a radiation-curable functional group can be adopted as reaction conditions such as the reaction temperature and the reaction duration in the above reaction. To prevent the unsaturated bond-containing group of the unsaturated bond-containing compound from reacting in the urethane conversion reaction, the urethane conversion step can be conducted in the presence of a polymerization inhibitor. Examples of polymerization inhibitors are benzoquinone compounds and phenothiazine compounds. There is no specific limitation to these compounds; various polymerization inhibitors can be employed.

A known reaction catalyst can be employed in the urethane conversion step. Examples are amine catalysts, organic tin catalysts, and organic bismuth catalysts. Examples of amine catalysts are diethylene triamine, N-methylmorpholine, and tetramethylhexanemethylene diamine. Further examples are dimethyl formamide, dimethylacetamide, and N-methylpyrrolidone. Examples of organic tin catalysts are dibutyltin dilaurate, dioctyltin dilaurate, dibutyltin didecanoate, and dioctyltin didecanoate. An example of organic bismuth catalysts is bismuth tris(2-ethylhexanoate). From the perspective of reaction efficiency, the use of an organic tin catalyst is desirable. The quantity of catalyst added is, for example, 0.00001 to 5 weight parts, desirably 0.00001 to 1 weight part, and preferably 0.00001 to 0.1 weight part per the combined quantity of the hydroxyl group-containing vinyl chloride resin and the unsaturated bond-containing compound.

The reaction solvent can be selected from among known solvents that are commonly employed in the synthesis of resins having radiation-curable functional groups. Examples are ketone solvents such as acetone, methyl ethyl ketone, and cyclohexanone; ester solvents such as methyl acetate, ethyl acetate, and ethyl lactate; ether solvents such dioxane and tetrahydrofuran; aromatic solvents such as toluene and xylene; amide solvents such as N,N-dimethyl formamide, N,N-dimethyl acetamide, and N-methyl pyrrolidone; sulfoxide solvents such as dimethyl sulfoxide; methylene chloride; chloroform; and cyclohexane.

Following the urethane conversion step set forth above, the vinyl chloride resin having at least one urethane bond and at least one unsaturated bond-containing group set forth above in a side chain that has been obtained in that step can be recovered from the reaction solution by a known method. It can be subjected to a Michael addition reaction step, or the reaction solution following the urethane conversion step can be subjected to the Michael addition reaction step as is. The latter embodiment is desirable from the perspective of simplifying the process.

<Michael Addition Reaction Step>

A Michael addition reaction refers to a reaction in which a nucleating agent is 1,4-added to an α,β-unsaturated carbonyl compound. A description will be given below for an example in which vinyl chloride resin having methacryloyloxy group has been obtained in the urethane conversion step.

In the reaction scheme given below, the wavy line denotes the main polyurethane skeleton, and X denotes a hydroxyl group-containing group.

In an embodiment of the Michael reaction, the proton of a thiol denoted by Z-A-SH (where A and Z are defined as in formula (1)) is removed (deprotonated) to produce an anion denoted by Z-A-S⁻. It is desirable to conduct a Michael addition reaction in a solvent containing a base to produce the anion. That is because deprotonation can occur due to the base contained in the solvent, producing an anion denoted by Z-A-S⁻. The anion that has been produced then undergoes 1,4-addition as a nucleating agent to the methacryloyloxy group contained in the vinyl chloride resin shown in the top portion of the reaction scheme, making it possible for a monovalent sulfur-containing substituent denoted by (—S-A-Z) in formula (1) to be added to the side chain of the vinyl chloride resin.

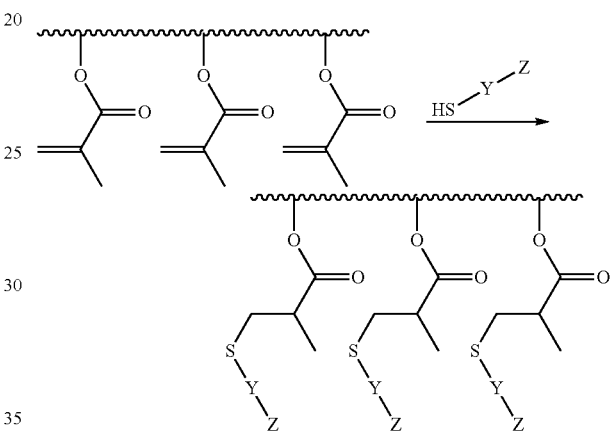

However, the Michael addition reaction in the above manufacturing method is not limited to being conducted in the presence of a base. From the perspective of yield, the Michael addition reaction is desirably conducted in the presence of a base. However, instead of a base, a catalyst known for use in the Michael addition reaction can be employed to conduct the Michael addition reaction.

The above Michael addition reaction can permit the introduction of the monovalent sulfur-containing substituent denoted by formula (1) at the position of the (meth)acryloyl (oxy) group. However, it is not necessary for all of the (meth)acryloyl(oxy) groups present in the vinyl chloride resin to reaction with the above thiol. Incorporation into the binder according to an aspect of the present invention with a portion still unreacted is also possible.

The thiol that is used in the Michael addition reaction step, denoted as Z-A-SH (where A and Z are defined as in formula (1)), can be synthesized by a known method or obtained as a commercial product. The active hydrogen groups that can be incorporated into the Z and A of the thiol are as set forth above. Hydroxyl groups, primary amino groups, and secondary amino groups are desirable, and hydroxyl groups are preferred. One thiol group is desirably incorporated per molecule.

The Michael addition reaction can be made to progress by admixing the thiol to a solution containing the vinyl chloride resin obtained in the urethane conversion step. As needed, a reaction catalyst can also be added. Part or all of the reaction solution obtained following the urethane conversion step is desirably used as the above solution.

As set forth above, when using a solvent containing a base, the base can deprotonate the thiol, causing the Michaels addition reaction to progress well. Either an organic or inorganic base can be employed. From the perspective of solvent solubility, the use of an organic base is desirable. For example, organic bases such as 8-diazabicyclo[5.4.0]undec-7-ene (DBU), triethylamine, tripropylamine, tributylamine, triamylamine, trihexylamine, trioctylamine, pyridine, and picoline can be employed. To increase the reaction rate, a strong base is desirably employed. The use of a base with a base strength pKb falling within a range of 6.50 to 13.0 is desirable. The base strength referred to in the present invention is a value that is measured by the following method.

A 50 mg sample is dissolved in a mixed liquid of 20 mL of water and 30 mL of tetrahydrofuran. A model GT-100Win automatic titrator made by Mitsubishi Chemical Analytech Co., Ltd. is employed to add 0.1N—HCl (Wako Pure Chemical Industries, Ltd.) dropwise and conduct a neutralization titration. The pH corresponding to a dropwise addition quantity of half of the quantity that has been added when the neutral point is reached is read. This pH is adopted as the base strength @Kb). The quantity of base used need only be adequate to deprotonate the thiol. For example, about 0.001 to 100 weight parts per 100 weight parts of thiol will suffice.

An organic solvent in which the thiol employed has good solubility is desirably selected for use. Examples that are suitable for use are, in any ratio, acetone, methyl ethyl ketone, methyl isobutyl ketone, diisobutyl ketone, cyclohexanone, isophorone, tetrahydrofuran, and other ketones; methanol, ethyanol, propanol, butanol, isobutyl alcohol, isopropyl alcohol, methyl cyclohexanol, and other alcohols; methyl acetate, butyl acetate, isobutyl acetate, isopropyl acetate, ethyl lactate, glycol acetate, and other esters; glycol dimethyl ether, glycol monoethyl ether, dioxane, and other glycol ethers; benzene, toluene, xylene, cresol, chlorobenzene, and other aromatic hydrocarbons; methylene chloride, ethylene chloride, carbontetrachloride, chloroform, ethylene chlorhydrin, dichlorobenzene, and other chlorinated hydrocarbons; N,N-dimethyl formamide; and hexane. Thiols generally exhibit good solubility in ketone solvents, so the use of at least 60 weight percent of a ketone solvent relative to the total amount of solvent employed is desirable. A 100 percent ketone solvent can also be employed. When employing the reaction solution following the Michael addition reaction step as is, or when adding another component such as a curing agent to form a coating, the solvent is desirably one that volatizes readily at a low boiling point. The ketone solvents are desirable for that reason. Thus, a ketone solvent is also used to conduct the urethane conversion step, and the reaction solution that is obtained following the urethane conversion step is desirably subjected to the Michael addition reaction step.

The quantity of vinyl chloride resin in the solvent is, for example, 1 to 40 weight parts per 100 weight parts of solvent. The quantity of thiol employed can be, for example, 0.2 to 20 weight parts per 100 weight parts of vinyl chloride resin. The reaction conditions can be identical to those normally employed in a Michael addition reaction. For example, the reaction temperature can be 20 to 90° C., the reaction duration can be 10 minutes to 10 hours, and the reaction can be conducted at atmospheric pressure.

Conducting the Michael addition reaction step set forth above can introduce the monovalent sulfur-containing substituent denoted by formula (1) into a side chain having a urethane bond.

The reaction solution obtained following the Michael addition reaction step contains the binder for a magnetic recording medium, set forth in detail above, in the form of vinyl chloride resin. This vinyl chloride resin can be recovered from the reaction solution by known methods and employed as binder for a magnetic recording medium, or the reaction solution as is, or solvent, ferromagnetic powder, nonmagnetic powder, additives, and various components can be added, to prepare a composition for a magnetic recording medium. Such a composition for a magnetic recording medium will be described below.

Composition for Magnetic Recording Medium

A further aspect of the present invention relates to a composition for a magnetic recording medium which comprises the above binder for a magnetic recording medium (also referred to as the "composition", hereinafter).

As set forth above, the binder for a magnetic recording medium that is contained in the composition contains at least one urethane bond and at least one active hydrogen group in the monovalent sulfur-containing substituent denoted by formula (1). The present inventor surmises that having such a structure can contribute to increasing the hardness of the coatings (magnetic layer, nonmagnetic layer, and the like) contained in the magnetic recording medium.

In one desirable embodiment, the composition contains a curing agent having at least one crosslinkable group capable of crosslinking with the active hydrogen group that is present in the binder. A single type of curing agent can be employed, or two or more different curing agents can be employed in combination. The crosslinkable group can be in the form of an isocyanate group, alkoxy group (such as an alkoxy group having 1 to 6 carbon atoms), a cyclic group having a partial structure denoted by —C(=O)—O—C(=O)—, or the like. The present inventor presumes that the fact that the binder comprises the monovalent sulfur-containing substituent denoted by formula (1) containing at least one active hydrogen group can contribute to increasing the reactivity (crosslinking property) with the curing agent. The reaction of the binder and the curing agent can normally progress in a heat treatment conducted in the process of manufacturing a magnetic recording medium. From the perspective of permitting the formation of harder coatings through combined use with the above binder for a magnetic recording medium, an isocyanate group is desirable as the crosslinkable group. Accordingly, a curing agent in the form of an isocyanate compound is desirable, and a bifunctional or greater isocyanate compound having two or more isocyanate groups (a polyisocyanate) is preferred.

The polyisocyanate employed can be in the form of a bifunctional or greater isocyanate compound such as trilene diisocyanate, 4,4'-diphenylmethane diisocyanate, hexamethylene diisocyanate, xylene diisocyanate, napthylene-1,5-diisocyanate, o-toluidine diisocyanate, isophorone diisocyanate, triphenylmethane triisocyanate, and other isocyanates; a product of one of these isocyanates and a polyalcohol; or a polyisocyanate produced by condensing an isocyanate. These can be synthesized by known methods and are available as commercial products. From the perspective of forming a harder coating, a trifunctional or greater polyisocyanate is desirably employed as the polyisocyanate. Specific examples of trifunctional and greater polyisocyanates are: a product obtained by adding three moles of trilene diisocyanate (TDI) to trimethylolpropane (TMD), a product obtained by adding three moles of hexamethylene diisocyanate (HDI) to TMP, a product obtained by adding three moles of isophorone diisocyanate (IPDI) to TMP, a product obtained by adding three moles of xylene diisocyanate (XDI) to TMP, and other adduct-type polyisocyanate products; condensed isocyanurate trimers of TDI, condensed isocyanurate pentamers of TDI, condensed isocyanurate heptamers of TDI, and mixtures thereof. Further examples are isocyanurate condensates of HDI, isocyanurate condensates of IPDI, and crude MDI. From the perspective of the strength of the coating that is formed, examples of polyisocyanates that are desirably employed in combination with the above hydroxyl-group vinyl chloride resin are polyisocyanates having a cyclic structure. The cyclic structure contained can be a saturated or unsaturated carbon ring or hetero ring, or an aromatic carbon ring or hetero ring. The quantity of curing agent employed is, for example, 5 to 80 weight parts per 100 weight parts of the above binder. The binder is desirably employed within a range of 5 to 50 weight parts per 100 weight parts of powder such as ferromagnetic powder or nonmagnetic powder as the content in the coating liquid for forming a coating such as the magnetic layer and nonmagnetic layer of a magnetic recording medium.

The above composition can optionally contain components that are commonly employed in the coating liquids for forming various coatings such as the magnetic layer and nonmagnetic layer of a magnetic recording medium, such as ferromagnetic powder, nonmagnetic powder, additives, and solvents. After adding such components, the composition can be employed as a coating liquid for forming the various above coatings. A solvent in the form of the various solvents given by way of example for the solvents suitable for use as the above reaction solvent can be employed as the solvent. The various additives that are commonly employed in particulate magnetic recording media can also be employed without restriction.

Magnetic Recording Medium

A further aspect of the present invention relates to a magnetic recording medium comprising a magnetic layer comprising ferromagnetic powder and binder on a nonmagnetic support, in the form of a magnetic recording medium having a layer containing at least one component selected from the group consisting of the above binder for a magnetic recording medium and a reaction product that has been formed in a reaction between the above binder for a magnetic recording medium and a curing agent comprising at least one crosslinkable group capable of crosslinking with the active hydrogen group present in the binder for a magnetic recording medium. The layer containing the above components can be formed using a coating liquid in the form of the composition for a magnetic recording medium according to an aspect of the present invention, or by preparing a coating liquid by adding the components set forth above. The combined use of a curing agent can yield a layer comprising the above reaction product. A layer containing such a reaction product is desirable because it can exhibit greater hardness.

In an embodiment, the layer containing the above component can be a magnetic layer. In another embodiment, it can be a nonmagnetic layer provided between the nonmagnetic support and the magnetic layer. In still another embodiment, it can be a backcoat layer that is provided on the opposite side of the nonmagnetic support from the magnetic layer. For example, providing a layer containing the above component as a magnetic layer makes it possible to provide a magnetic recording medium that is suitable as a backup tape that is highly durable and can withstand long periods of contact sliding between magnetic heads and the magnetic layer.

With the exception of having at least one layer containing the above component, known techniques relating to particulate magnetic recording media can be applied without restriction to the magnetic recording medium according to an aspect of the present invention. For example, reference can be made to the description of paragraphs 0018 to 0027 of Japanese Unexamined Patent Publication (KOKAI) No. 2011-216179 for the magnetic layer; paragraphs 0028 to 0176 of the same for the nonmagnetic layer; and paragraphs 0177 to 0187 and Examples of the same for additional details regarding the nonmagnetic support, backcoat layer, layer structure, and manufacturing methods. The content of Japanese Unexamined Patent Publication (KOKAI) No. 2011-216179 is expressly incorporated herein by reference in its entirety.

EXAMPLES

The present invention will be described in detail below based on Examples. However, the present invention is not limited to embodiments shown in Examples. The terms "parts" and "percent" given in Examples are weight parts and weight percent unless otherwise stated.

Example 1-1

1. Urethane Conversion Step

Vinyl chloride resin (MR104) made by Zeon Corp. was employed as the hydroxyl group-containing vinyl chloride resin. This vinyl chloride resin contained the following structural units.

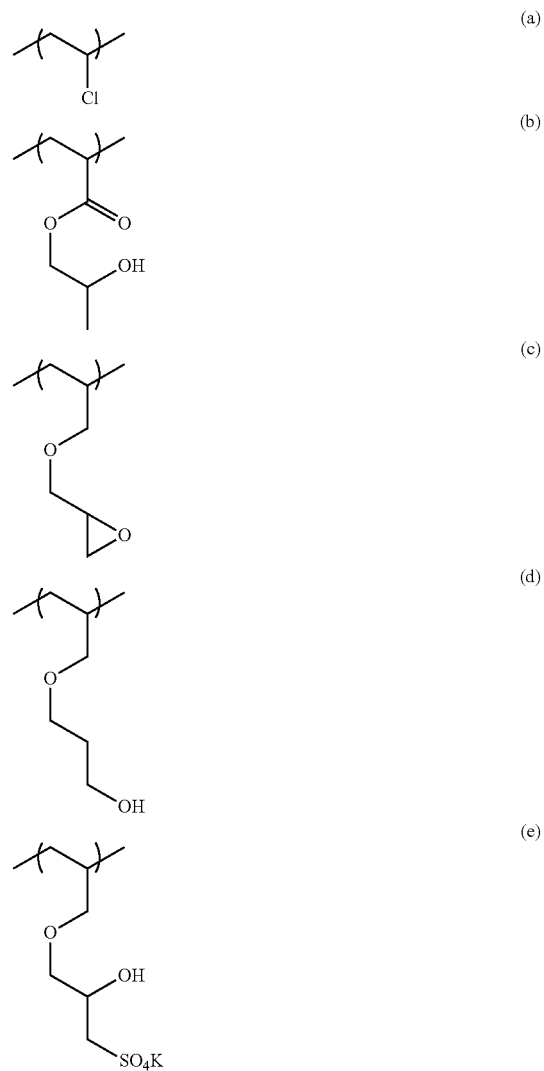

In a reactor, 249.6 g of the above hydroxyl-group containing vinyl chloride resin and 582.4 g of cyclohexanone were weighed out and mixed under conditions of a liquid temperature of 60° C. and a stirring rate of 210 rpm. The liquid temperature was adjusted to 40 to 50° C., 0.5 g (4.464 mmol) of 1,4-benzoquinone was added as a polymerization inhibitor, 0.125 g of dibutyltin dilaurate was added as a reaction catalyst, and the components were dissolved.

Next, 13.75 g (0.04 mol) of unsaturated bond-containing compound having an isocyanate group and a methacryloyloxy group (2-methacryloyloxyethyl isocyanate (KarenzMOI, made by Showa Denko) was added dropwise over 30 minutes to the reaction solution within the above reactor. Following the dropwise addition, the mixture was stirred for 2 hours at 40° C. to obtain vinyl chloride resin solution A.

The above process converted above structural units (b), (d) and (e) to the structural units (b)-1, (d)-1, and (e)-1 indicated below.

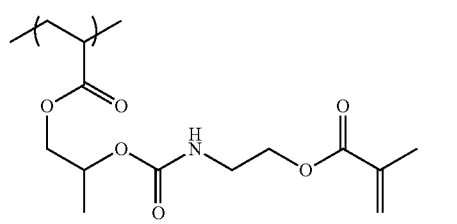
(b)-1

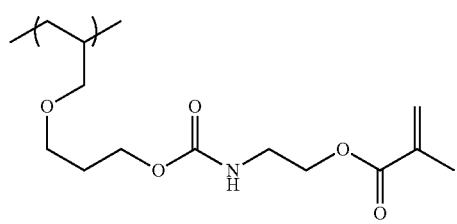
(d)-1

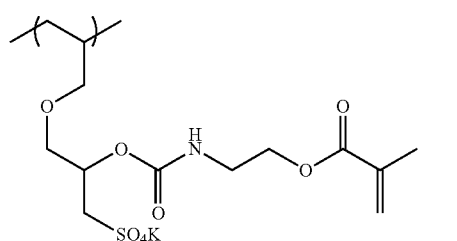
(e)-1

2. Michael Addition Reaction Step

The liquid temperature of vinyl chloride resin solution A (846.4 g) obtained in 1. above was raised to 50° C. Reaction catalysts in the form of 0.125 g of 1,8-diazabicyclo[5.4.0]undec-7-ene (DBU) and 9.58 g of a thiol having an active hydrogen group (hydroxyl group) in the form of 1-thioglycerol (ATG) were admixed and the mixture was subjected to a Michael addition reaction to obtain vinyl chloride resin solution B.

In the above process, structural units (b)-1, (d)-1, and (e)-1 were converted to structural units (b)-2, (d)-2, and (e)-2.

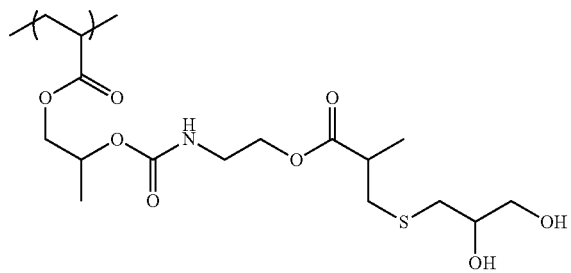
(b)-2

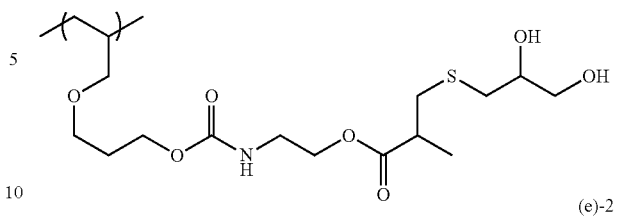
(d)-2

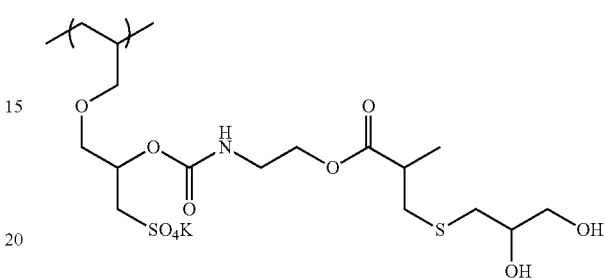
(e)-2

3. Measurement of Weight Average Molecular Weight

The weight average molecular weight of the vinyl chloride resin contained in the vinyl chloride resin solution B obtained in 2. above was 55,000 when determined by GPC using a DMF solvent containing 0.3% lithium bromide and converted to standard polystyrene.

4. Confirming the Presence or Absence of Unreacted ATG

When a portion of vinyl chloride resin solution B was collected and the presence or absence of unreacted ATG was determined by gas chromatography analysis under the following analysis conditions, none was detected.

(Gas Chromatography Analysis Conditions)
Device: GC-17A made by Shimadzu
Column: DB-1
Column temperature: 50° C.
Inlet temperature: 250° C.
Detector temperature: 250° C.
Column temperature increase program: 50° C./5 min-->10° C./1 min to 250° C. temperature raised-->250° C./10 min.

5. Calculation of Hydroxyl Group Equivalent

The hydroxyl group equivalence of the vinyl chloride resin contained in vinyl chloride resin solution B above was calculated by the following method to be 36.

Vinyl chloride resin solution was precisely weighed out into a three-necked flask so that the solid fraction of the vinyl chloride resin was 1 weight part; 0.25 weight part of acetic anhydride and 4.75 weight parts of pyridine were added, and the mixture was reacted for 1 hour at 50° C. Subsequently, 10 weight parts of ion-exchange water was added and the mixture was stirred for 10 minutes, at which point 10 weight parts of 2-butanol were added. The solution obtained was titrated with 0.5 N—KOH/EtOH solution to determine the titration end point.

With the exception that the vinyl chloride resin solution was not weighed, a blank test was conducted by the following method.

The hydroxyl group equivalent was calculated from equation (A) set forth above based on the hydroxyl group value obtained from the following equation.

Hydroxyl group value=(blank test 0.5 N—KOH/ EtOH drop amount−vinyl chloride resin solution 0.5 N—KOH/EtOH drop amount)×5000

6. Calculation of Number of Hydroxyl Groups Introduced by Michael Addition Reaction Calculation by the following method of the number of hydroxyl groups introduced to the vinyl chloride resin by the above Michael addition reaction revealed 37 group per molecule (since no unreacted ATG was detected, the calculation was made using the method indicated below with a reaction rate of 100%).

(Method of Calculating the Number of Hydroxyl Groups Introduced)

Number of hydroxyl groups introduced=amount of thiol employed in Michael addition reaction step (mmol)×reaction rate (%)×number of hydroxyl groups present per thiol molecule÷solid weight (g) of vinyl chloride resin subjected to Michael addition reaction step×weight average molecular weight÷100,000

(Method of Calculating Solid Weight of Vinyl Chloride Resin Subjected to Michael Addition Reaction Step)

Solid weight (g) of vinyl chloride resin=weight (g) of hydroxyl group-containing vinyl chloride resin subjected to urethane conversion step+ weight (g) of unsaturated bond-containing compound subjected to urethane conversion step

Example 1-2

1. Urethane Conversion Step

Vinyl chloride resin (MR104) made by Zeon Corp. was employed as hydroxyl group-containing vinyl chloride resin. To a reactor were weighed out 249.6 g of the hydroxyl group-containing vinyl chloride resin and 582.4 g of cyclohexanone and the mixture was mixed under conditions of a liquid temperature of 60° C. and a stirring rate of 210 rpm. The liquid temperature was adjusted to 40 to 50° C. and 0.2 g (1.00 mmol) of a polymerization inhibitor in the form of phenothiazine and 0.125 g of a reaction catalyst in the form of dibutyltin dilaurate were added and dissolved.

Next, 10.56 g (0.04 mol) of unsaturated bond-containing compound (1,1-(bisacryloyloxymethyl)ethyl isocyanate (KarenzBEI made by Showa Denko) having an isocyanate group and an acryloyloxy group was added dropwise over 30 minutes to the reaction solution in the above reactor. With completion of the dropwise addition, the mixture was stirred for 2 hours at 50° C. to obtain vinyl chloride resin solution C.

Above structural units (b), (d), and (e) were converted to structural units (b)-11, (d)-11, and (e)-11 below by the above process.

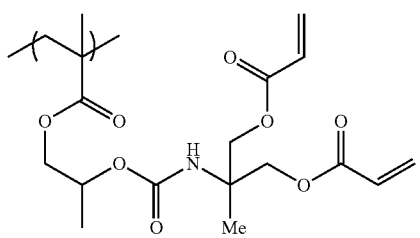

(b)-11

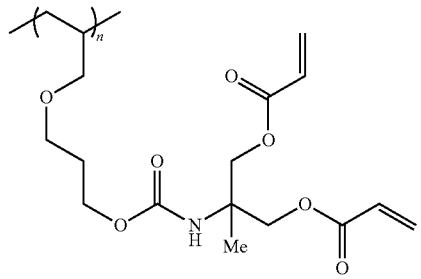

(d)-11

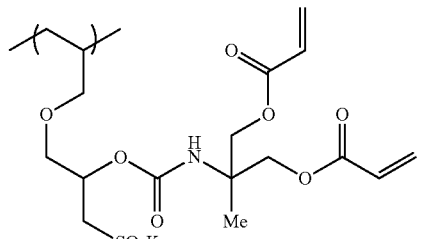

(e)-11

2. Michael Addition Reaction Step

With the exceptions that the vinyl chloride resin solution C obtained in 1. above was employed and the quantity of ATG employed was changed to 4.79 g, vinyl chloride resin solution D was obtained by the same method as in the Michael addition reaction step of Example 1-1. Subsequently, various measurements and calculations were conducted in the same manner as in Example 1-1.

By means of the above process, structural units (b)-11, (d)-11, and (e)-11, for example, could be converted to structural units (b)-12, (d)-12, and (e)-12 below. Structural units (b)-12, (d)-(12), and (e)-12 below were structures such that one of the two unsaturated bonds contained in each of structural units (b)-11, (d)-11, and (e)-11 were supplied to the Michael addition reaction, but structures where both are supplied to the Michael addition reaction can also be contained.

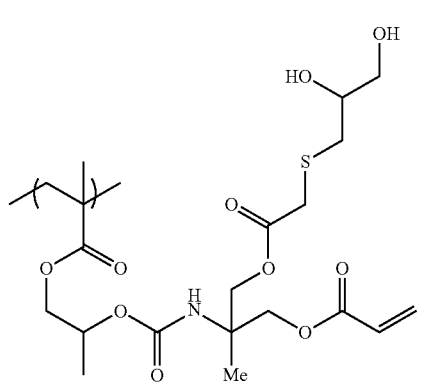

(b)-12

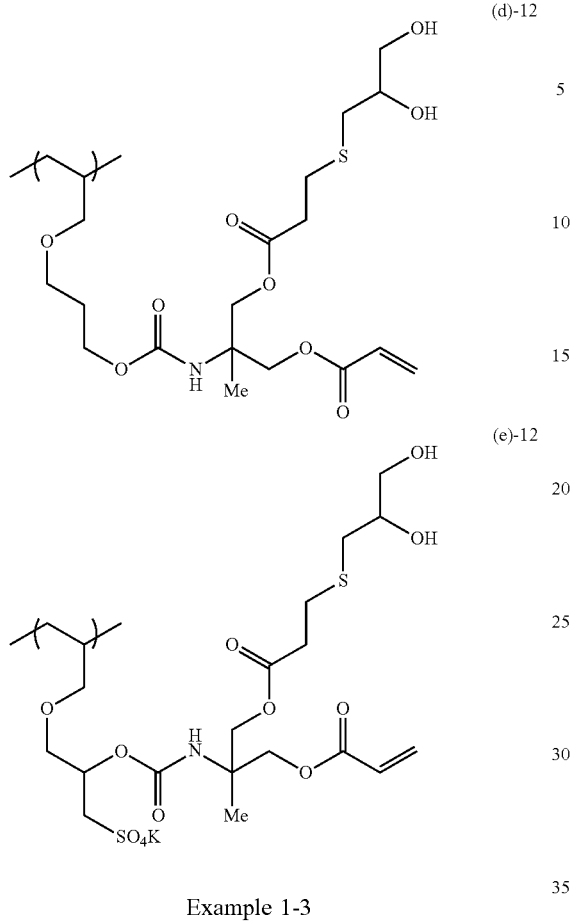

Example 1-3

With the exception that the quantity of ATG employed in the Michael addition reaction step was changed to 2.40 g, a vinyl chloride resin solution was obtained by the same method as in Example 1-1. Subsequently, various measurements and calculations were conducted in the same manner as in Example 1-1.

Example 1-4

The Michael addition reaction step was conducted by the following method.

An 842.9 g quantity of the vinyl chloride resin solution C obtained in the urethane conversion step of Example 1-2 was heated to a temperature of 50° C., 0.125 g of reaction catalyst in the form of DBU and 2.38 g of active hydrogen group (hydroxyl group)-containing thiol in the form of 3-mercapto-1-propanol (3MP) were admixed, and the mixture was subjected to a Michael addition reaction to obtain a vinyl chloride resin solution.

Subsequently, various measurements and calculations were conducted in the same manner as in Example 1-1. The presence of unreacted 3MP was checked for by the same method as when checking for unreacted ATG, and none was found.

By means of the above process, it was possible to convert the above structural units (b)-11, (d)-11, and (e)-11 to, for example, the structural units (b)-13, (d)-13, and (e)-13 below. Structural units (b)-13, (d)-(13), and (e)-13 below were structures such that one of the two unsaturated bonds contained in each of structural units (b)-11, (d)-11, and (e)-11 were supplied to the Michael addition reaction, but structures where both are supplied to the Michael addition reaction can also be contained.

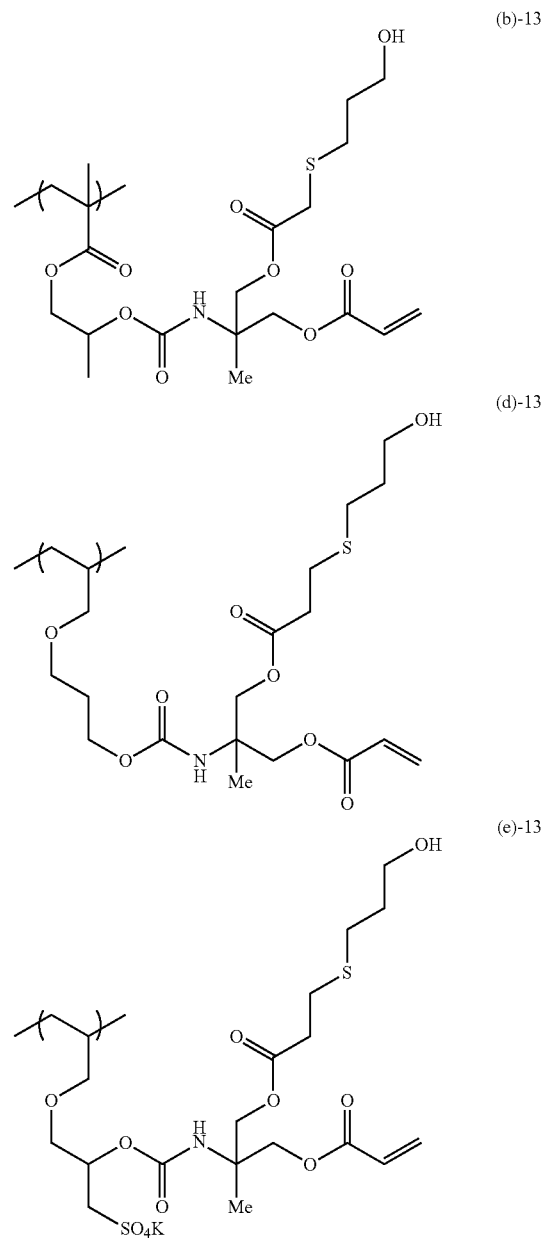

Example 1-5

The Michael addition reaction step was conducted by the following method.

An 842.9 g quantity of the vinyl chloride resin solution C obtained in the urethane conversion step of Example 1-2 was heated to a temperature of 50° C., 0.125 g of reaction catalyst in the form of DBU and 3.38 g of active hydrogen group (hydroxyl group)-containing thiol in the form of 6-mercapto-1-hexanol (6MH) were admixed, and the mixture was subjected to a Michael addition reaction to obtain a vinyl chloride resin solution.

Subsequently, various measurements and calculations were conducted in the same manner as in Example 1-1. The presence of unreacted 6MH was checked for by the same method as when checking for unreacted ATG, and none was found.

By means of the above process, it was possible to convert the above structural units (b)-11, (d)-11, and (e)-11 to, for example, the structural units (b)-14, (d)-14, and (e)-14 below. Structural units (b)-14, (d)-(14), and (e)-14 below were structures such that one of the two unsaturated bonds contained in each of structural units (b)-11, (d)-11, and (e)-11 were supplied to the Michael addition reaction, but structures where both are supplied to the Michael addition reaction can also be contained.

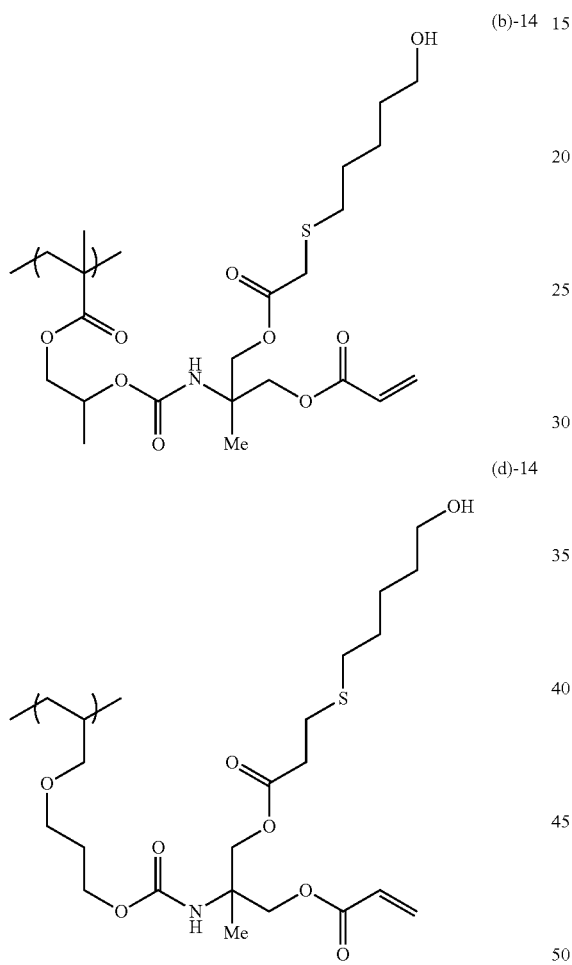

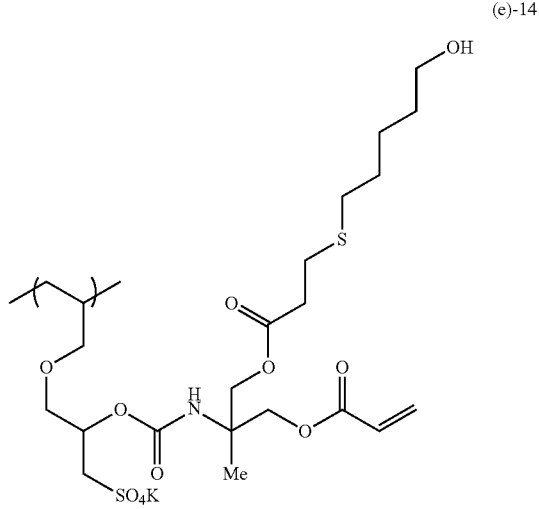

The structures of the thiols employed in the above Examples are given below.

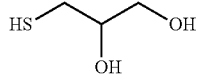

1-thioglycerol

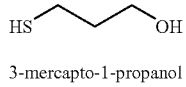

3-mercapto-1-propanol

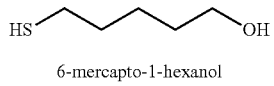

6-mercapto-1-hexanol

The results of the above are given in Table 1.

| | Urethane conversion step Unsaturated bond-containing compound | Michael addition reaction step | | | | | Weight average molecular weight | Presence or absence of unreacted thiol | Number of hydroxyl groups introduced by Michael addition reaction (no./molecule) | Hydroxyl value (mmol/kg) | Hydroxyl equivalent |
|---|---|---|---|---|---|---|---|---|---|---|---|
| | | Amount of vinyl chloride resin solution (g) | Solid weight of vinyl chloride resin (g) | Amount of thiol (g) | | | | | | | |
| | | | | ATG | 3MP | 6MH | | | | | |
| Example 1-1 | MOI | 846.4 | 263.4 | 9.58 | | | 55,000 | Undetected | 37 | 649 | 36 |
| Example 1-2 | MOI | 846.4 | 263.4 | 4.79 | | | 55,000 | Undetected | 18 | 330 | 18 |

-continued

| | Urethane conversion step Unsaturated bond-containing compound | Michael addition reaction step | | | | | | | Number of hydroxyl groups | | |
|---|---|---|---|---|---|---|---|---|---|---|---|
| | | Amount of vinyl chloride resin solution (g) | Solid weight of vinyl chloride resin (g) | Amount of thiol (g) | | | Weight average molecular weight | Presence or absence of unreacted thiol | introduced by Michael addition reaction (no./molecule) | Hydroxyl value (mmol/kg) | Hydroxyl equivalent |
| | | | | ATG | 3MP | 6MH | | | | | |
| Example 1-3 | MOI | 846.4 | 263.4 | 2.4 | | | 55,000 | Undetected | 9 | 167 | 9 |
| Example 1-4 | BEI | 842.9 | 260.2 | | 2.38 | | 55,000 | Undetected | 5 | 98 | 5 |
| Example 1-5 | BEI | 842.9 | 260.2 | | | 3.38 | 55,000 | Undetected | 5 | 96 | 5 |

Example 2-1

1. Fabrication of Resin Film

A 3.0 g quantity (weight of solid fraction 0.96 g) of the vinyl chloride resin solution obtained in Example 1-1, 0.28 g of polyisocyanate solution (Coronate 3041, made by Nippon Polyurethane Industry Co., Ltd., isocyanate group content rate 8.7%, solid fraction weight 0.14 g), and 1.12 g of cyclohexanone were mixed to prepare a solution with a 25% solid fraction concentration.

The prepared solution was coated on a base film (Torelina (Japanese registered trademark) 50-3000 made by Toray), and dried for 1 hour at ordinary pressure and 100° C., 3 hours at ordinary pressure and 140° C., and then 48 hours at ordinary pressure and 100° C. The coating was then separated from the base film to obtain a resin film.

The solid fraction weight of the above vinyl chloride film solution was measured by the following method to obtain the solid fraction concentration. The solid fraction weight of the polyisocyanate solution was obtained in the same manner.

(Method of Measuring Solid Fraction Concentration)

One weight part of vinyl chloride resin solution was gathered in an aluminum cup, dried a first time under conditions of 40° C. at atmospheric pressure for one hour and dried a second time under conditions of 140° C. under vacuum for 3 hours. Following the second drying, the aluminum cup was placed for 30 minutes in an environment of 27° C. and 50% relative humidity and then weighed on a scale.

The weight of the vinyl chloride resin remaining in the aluminum cup following drying was divided by one weight part and multiplied by 100 to obtain the solid fraction concentration (weight %).

2. Measurement of Stress at Rupture and Young's Modulus

The stress at rupture and elongation rate of a sample of the resin film obtained in 1. above measuring 1.0 cm×5 cm were measured under conditions of a load of 2.5 kgf and a speed of 50 mm/min with a Strograph V series (model: V1-C) made by Toyo Seiki Seisaku-sho, Ltd. Young's modulus was calculated from the slope of the strograph curve at an elongation rate of 0 to 0.5%.

3. Calculation of Number of Crosslink Points

In the solution employed to fabricate the resin film, since fewer isocyanate groups were contained in the polyisocyanate than hydroxyl groups incorporated into the side chain of the vinyl chloride resin, the number of the crosslink points between isocyanate groups and hydroxyl groups was obtained by the following method as the number of isocyanate groups contained in the polyisocyanate.

(Number of Crosslink Points Per Molecule of Vinyl Chloride Resin)=A÷B $A$=number of mols (mol) of isocyanate groups contained in polyisocyanate=solid weight of polyisocyanate (g)×content ratio (%) of isocyanate groups÷100÷42

$B$=number of mols (mol) of vinyl chloride resin=weight of vinyl chloride resin÷weight average molecular weight Mw of vinyl chloride resin

Example 2-2

A 3.0 g quantity (0.94 g solid fraction weight) of the vinyl chloride resin solution obtained in Example 1-2, 0.18 g of polyisocyanate solution (Coronate 3041, made by Nippon Polyurethane Industry Co., Ltd., solid fraction weight 0.10 g), and 0.98 g of cyclohexanone were mixed to prepare a solution with a 25% solid fraction concentration.

The remainder was conducted in the same manner as in Example 2-1.

Example 2-3

A 3.0 g quantity (0.94 g solid fraction weight) of the vinyl chloride resin solution obtained in Example 1-2, 0.18 g of polyisocyanate solution (Coronate 3041, made by Nippon Polyurethane Industry Co., Ltd., solid fraction weight 0.19 g), and 1.18 g of cyclohexanone were mixed to prepare a solution with a 25% solid fraction concentration.

The remainder was conducted in the same manner as in Example 2-1.

Example 2-4

A 3.0 g quantity (0.94 g solid fraction weight) of the vinyl chloride resin solution obtained in Example 1-2, 0.55 g of polyisocyanate solution (Coronate 3041, made by Nippon Polyurethane Industry Co., Ltd., solid fraction weight 0.29 g), and 1.38 g of cyclohexanone were mixed to prepare a solution with a 25% solid fraction concentration.

The remainder was conducted in the same manner as in Example 2-1.

Example 2-5

A 3.0 g quantity (0.94 g solid fraction weight) of the vinyl chloride resin solution obtained in Example 1-3, 0.18 g of polyisocyanate solution (Coronate 3041, made by Nippon Polyurethane Industry Co., Ltd., solid fraction weight 0.10 g), and 0.95 g of cyclohexanone were mixed to prepare a solution with a 25% solid fraction concentration.

The remainder was conducted in the same manner as in Example 2-1.

Example 2-6

A 3.0 g quantity (0.89 g solid fraction weight) of the vinyl chloride resin solution obtained in Example 1-4, 0.28 g of polyisocyanate solution (Coronate 3041, made by Nippon Polyurethane Industry Co., Ltd., solid fraction weight 0.14 g), and 0.87 g of cyclohexanone were mixed to prepare a solution with a 25% solid fraction concentration.

The remainder was conducted in the same manner as in Example 2-1.

Example 2-7

A 3.0 g quantity (0.90 g solid fraction weight) of the vinyl chloride resin solution obtained in Example 1-5, 0.28 g of polyisocyanate solution (Coronate 3041, made by Nippon Polyurethane Industry Co., Ltd., solid fraction weight 0.14 g), and 0.88 g of cyclohexanone were mixed to prepare a solution with a 25% solid fraction concentration.

The remainder was conducted in the same manner as in Example 2-1.

Example 2-8

A 3.0 g quantity (0.89 g solid fraction weight) of the vinyl chloride resin solution obtained in Example 1-4 and 0.56 g of cyclohexanone were mixed to prepare a solution with a 25% solid fraction concentration.

The remainder was conducted in the same manner as in Example 2-1.

Comparative Example 1

A 1.0 g quantity of vinyl chloride resin (MR104, made by Zeon Corp.) was fully dissolved in 3.3 g of cyclohexanone and 0.29 g of polyisocyanate solution (Coronate 3041, made by Nippon Polyurethane Industry Co., Ltd., solid fraction weight 0.15 g) was admixed to prepare a solution with a 25% solid fraction concentration.

The remainder was conducted in the same manner as in Example 2-1.

Comparative Example 2

A 1.0 g quantity of vinyl chloride resin (MR104, made by Zeon Corp.) was fully dissolved in 3.0 g of cyclohexanone to obtain a resin solution. This solution was then used to prepare a resin film by the same method as in Example 2-1.

The remainder was conducted in the same manner as in Example 2-1.

The results of the above are given in Table 2.

TABLE 2

| | Vinyl chloride resin solution | Quantity of vinyl chloride resin solution (g) | Weight of solid fraction in vinyl chloride resin solution (g) | Quantity of polyisocyanate solution (g) | Weight of solid fraction in polyisocyanate solution (g) | Quantity of cyclohexanone (g) | Stress at rupture (MPa) | Young's modulus (GPa) | Number of crosslink points |
|---|---|---|---|---|---|---|---|---|---|
| Example 2-1 | Example 1-1 | 3.0 | 0.96 | 0.28 | 0.14 | 1.12 | 76 | 2.8 | 17 |
| Example 2-2 | Example 1-2 | 3.0 | 0.94 | 0.18 | 0.10 | 0.98 | 72 | 2.7 | 12 |
| Example 2-3 | Example 1-2 | 3.0 | 0.94 | 0.37 | 0.19 | 1.18 | 74 | 2.7 | 23 |
| Example 2-4 | Example 1-2 | 3.0 | 0.94 | 0.55 | 0.29 | 1.38 | 81 | 2.8 | 35 |
| Example 2-5 | Example 1-3 | 3.0 | 0.94 | 0.18 | 0.10 | 0.95 | 73 | 2.7 | 12 |
| Example 2-6 | Example 1-4 | 3.0 | 0.89 | 0.28 | 0.14 | 0.87 | 78 | 2.8 | 18 |
| Example 2-7 | Example 1-5 | 3.0 | 0.90 | 0.28 | 0.14 | 0.88 | 80 | 2.8 | 18 |
| Example 2-8 | Example 1-4 | 3.0 | 0.89 | — | — | 0.56 | 67 | 2.5 | 0 |
| Comparative Example 1 | Vinyl chloride resin, MR104, made by Zeon Corp. | — | 1.00 (quantity of resin added during preparation of solution) | 0.29 | 0.15 | 3.30 | 56 | 2.3 | 17 |
| Comparative Example 2 | Vinyl chloride resin, MR104, made by Zeon Corp. | — | 1.00 (quantity of resin added during preparation of solution) | — | — | 3.00 | 53 | 2.3 | 0 |

Evaluation Results

Based on the results given in Table 2, the resin films fabricated in Examples were found to have better stress at rupture and Young's moduli than the resin films fabricated in Comparative Examples. Of these, the resin films of Examples 2-1 to 2-7, which were fabricated with the combined use of a curing agent (polyisocyanate), exhibited markedly better stress at rupture and Young's moduli. For example, a comparison of Example 2-1 and Comparative Example 1 reveals that although they had the same value for the number of crosslink points (the number of crosslink points formed when all of the polyisocyanate employed to fabricate the resin film was crosslinked), Example 2-1 exhibited a better stress at rupture and Young's modulus than Comparative Example 1. Although merely conjecture, it may be that vinyl chloride resin that comprises a side chain containing at least one urethane group and at least one monovalent sulfur-containing substituent denoted by formula (1) has good reactivity (a good crosslinking property) with the curing agent. Thus, the resin film fabricated in Example 2-1 was thought to contain a more extensive crosslinking structure than the resin film fabricated in Comparative Example 1. The present inventor presumes that this contributed to enhancing the stress at rupture and Young's modulus.

Based on the above results, vinyl chloride resin comprising at least one side chain containing at least one urethane bond and at least one monovalent sulfur-containing substituent denoted by formula (1) was determined to permit the formation of a hard coating. The use of such vinyl chloride resin as binder in a magnetic recording medium can permit the formation of a magnetic recording medium having hard coatings (magnetic layer, nonmagnetic layer, and the like) with excellent running durability.

The present invention is useful in fields involving the manufacturing magnetic recording media, such as in the field of manufacturing backup tapes required to afford repeated running durability.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. Binder for a magnetic recording medium, which is vinyl chloride resin comprising at least one side chain, the side chain comprising:
    at least one urethane bond; and
    at least one monovalent sulfur-containing substituent denoted by formula (1):

  (1)

wherein, in formula (1), A denotes a divalent connecting group which may comprise one or more active hydrogen groups and Z denotes an active hydrogen group.

2. The binder for a magnetic recording medium according to claim 1, wherein, in formula (1), A denotes an alkylene group which may be substituted with one or more active hydrogen groups.

3. The binder for a magnetic recording medium according to claim 2, wherein the active hydrogen group denoted by Z is a hydroxyl group.

4. The binder for a magnetic recording medium according to claim 3, wherein the side chain further comprises one or more functional groups selected from the group consisting of a sulfuric acid group, a sulfate group, a sulfonic acid group, and a sulfonate group.

5. The binder for a magnetic recording medium according to claim 4, which further comprises at least one epoxy group-comprising side chain.

6. The binder for a magnetic recording medium according to claim 2, wherein the side chain further comprises one or more functional groups selected from the group consisting of a sulfuric acid group, a sulfate group, a sulfonic acid group, and a sulfonate group.

7. The binder for a magnetic recording medium according to claim 1, wherein the active hydrogen group denoted by Z is a hydroxyl group.

8. The binder for a magnetic recording medium according to claim 7, wherein the side chain further comprises one or more functional groups selected from the group consisting of a sulfuric acid group, a sulfate group, a sulfonic acid group, and a sulfonate group.

9. The binder for a magnetic recording medium according to claim 1, wherein the side chain further comprises one or more functional groups selected from the group consisting of a sulfuric acid group, a sulfate group, a sulfonic acid group, and a sulfonate group.

10. The binder for a magnetic recording medium according to claim 9, which further comprises at least one epoxy group-comprising side chain.

11. The binder for a magnetic recording medium according to claim 1, which further comprises at least one epoxy group-comprising side chain.

12. A method of manufacturing binder for a magnetic recording medium, which comprises:
    reacting hydroxyl-group containing vinyl chloride resin with an unsaturated bond-containing compound which comprises at least one isocyanate group and at least one unsaturated bond-containing group selected from the group consisting of an acryloyloxy group, a methacryloyloxy group, an acryloyl group, and a methacryloyl group, to form a urethane bond between the hydroxyl group in the vinyl chloride resin and the isocyanate group in the unsaturated bond-containing compound and yield vinyl chloride resin comprising at least one urethane bond and at least one unsaturated bond-containing group in a side chain, and
    subjecting the vinyl chloride resin that has been yielded and a thiol comprising at least one active hydrogen group to a Michael addition reaction in a solvent, to yield binder for a magnetic recording medium which is vinyl chloride resin comprising at least one side chain, the side chain comprising:
at least one urethane bond; and
at least one monovalent sulfur-containing substituent denoted by formula (1):

—S-A-Z  (1)

wherein, in formula (1), A denotes a divalent connecting group which may comprise one or more active hydrogen groups and Z denotes an active hydrogen group.

13. The method of manufacturing according to claim 12, wherein the active hydrogen group is a hydroxyl group.

14. The method of manufacturing according to claim 12, wherein the Michael addition reaction is conducted in a base-containing solvent.

15. The method of manufacturing according to claim 14, wherein the base is an organic base.

16. The method of manufacturing according to claim 12, wherein the solvent comprises a ketone solvent.

17. A composition, which is a composition for a magnetic recording medium and comprises binder for a magnetic recording medium which is vinyl chloride resin comprising at least one side chain, the side chain comprising:
at least one urethane bond; and
at least one monovalent sulfur-containing substituent denoted by formula (1):

—S-A-Z  (1)

wherein, in formula (1), A denotes a divalent connecting group which may comprise one or more active hydrogen groups and Z denotes an active hydrogen group.

18. The composition according to claim 17, which further comprises a curing agent comprising a crosslinkable group capable of crosslinking with the active hydrogen group present in the binder for a magnetic recording medium.

19. The composition according to claim 18, wherein the curing agent comprise polyisocyanate.

20. A magnetic recording medium comprising a magnetic layer comprising ferromagnetic powder and binder on a nonmagnetic support, which comprises:
a layer containing at least component selected from the group consisting of binder for a magnetic recording medium and a reaction product, wherein
the binder for a magnetic recording medium is vinyl chloride resin comprising at least one side chain, the side chain comprising:
at least one urethane bond; and
at least one monovalent sulfur-containing substituent denoted by formula (1):

—S-A-Z  (1)

wherein, in formula (1), A denotes a divalent connecting group which may comprise one or more active hydrogen groups and Z denotes an active hydrogen group, and
the reaction product is a reaction product that has been formed in a reaction between the binder for a magnetic recording medium and a curing agent comprising at least one crosslinkable group capable of crosslinking with the active hydrogen group present in the binder for a magnetic recording medium.

* * * * *